United States Patent

[11] 3,627,098

| [72] | Inventor | Clyde Lorenz, deceased late of Lenexa, Kans. by Pauline Lorenz, administratrix, 12910 West 92nd St., Lenexa, Kans. 66215 |
|---|---|---|
| [21] | Appl. No. | 11,620 |
| [22] | Filed | Feb. 16, 1970 |
| [45] | Patented | Dec. 14, 1971 |

[54] APPARATUS FOR CONVEYOR
4 Claims, 6 Drawing Figs.

[52] U.S. Cl. ................................................ 198/7 BL, 198/129
[51] Int. Cl. ................................................ B65b 65/02
[50] Field of Search ........................................ 198/23, 27, 28, 173, 197, 198, 178, 7 BL, 129

[56] References Cited
UNITED STATES PATENTS

| 1,722,673 | 6/1929 | Nevala | 198/198 |
| 2,918,162 | 12/1959 | Ervin | 198/7 BL |
| 2,785,810 | 3/1957 | Kneib | 198/7 BL |

Primary Examiner—Richard E. Aegerter
Attorney—Jack Hensel

ABSTRACT: A conveyor having a shedder arm to lift material from carrier lugs or bars thus avoiding tearing or wrapping.

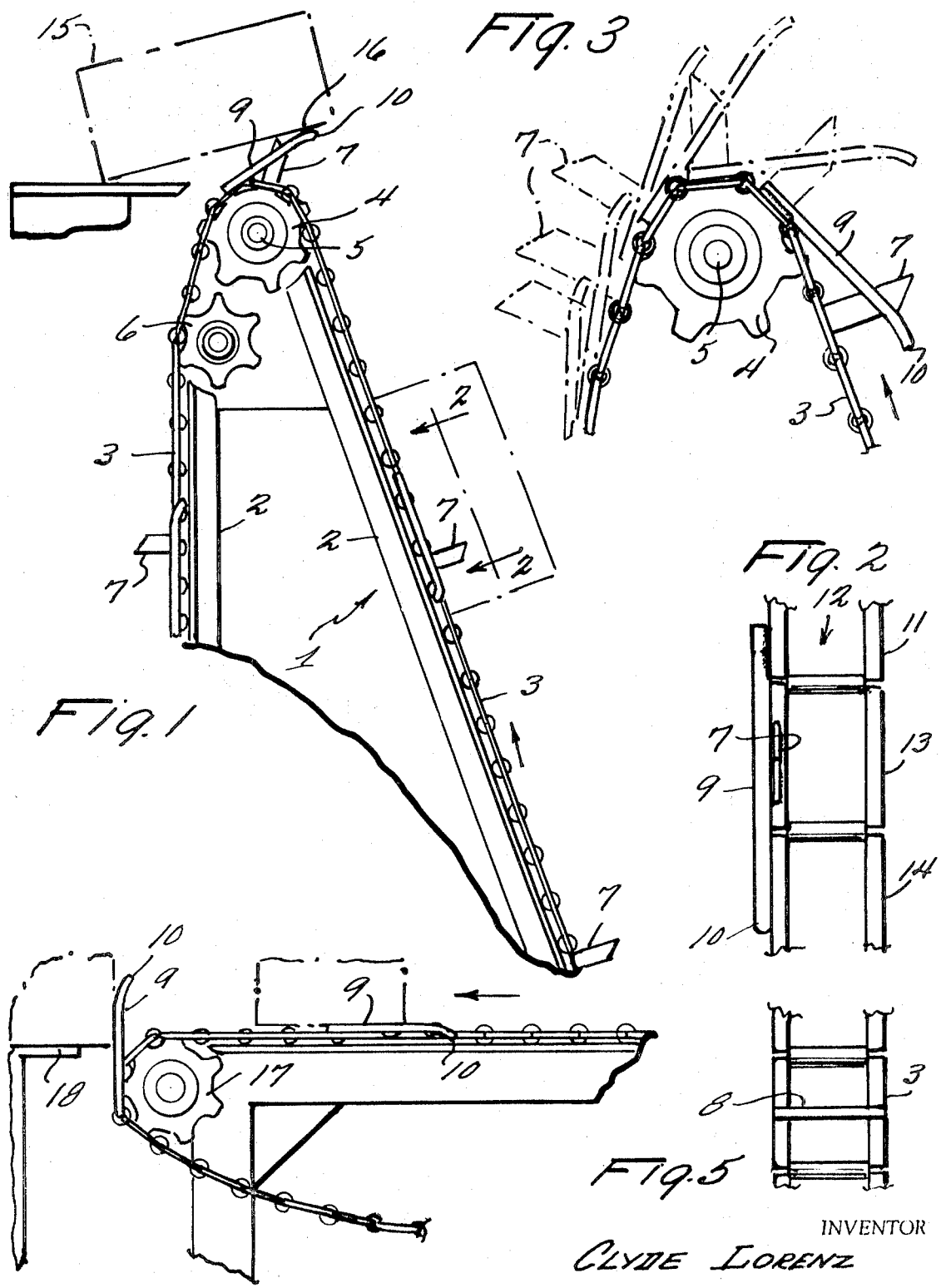

INVENTOR

CLYDE LORENZ

BY

Jack Hensel

ATTORNEY

APPARATUS FOR CONVEYOR

This invention relates to improvements in conveyors particularly to conveyors adapted to convey or transport baled or shocked forage or other commodities which may be conveyed by an endless conveyor. It also relates to improvements in gathering and feeding devices used on crop-harvesting machines.

In the past conveyors designed to various articles such as hay bales, both round and square or rectangular, forage crops such as corn, alfalfa, sorghum and the like have been developed. These conveyors, usually in the form of an endless link chain construction, were designed to transport the above-enumerated commodities in the field during harvest and were either an integral part of various harvesting machines or adapted to be used in connection therewith. In certain instances the conveyor was designed to transport the commodities in a horizontal manner from one location to another. In other instances these conveyors were so designed to transport the commodities in an elevated manner such as, for example, from ground level to an elevated level for placement on a wagon, trailer or truck for subsequent transport to a distant location. In still other instances these conveyors direct standing crops such as corn into cutting devices. These prior art conveyors in the form of an endless link chain construction were equipped with impaling lugs or plates to engage the baled or shocked forage to coact with the chain to move the forage in the direction of the moving chain without slipping, sliding or falling from the chain conveyor. These conveyors are equipped with chain sprockets, including the usual idler chain sprockets as well as a drive sprocket. As the bales and the like are transported on the conveyor toward their ultimate delivery destination, various means have been devised to disengage them from the impaling lugs to avoid ripping or tearing. As the standing crops are harvested and directed into the cutting devices, the lugs become entangled and require frequent stopping to permit freeing the lugs. Such means have not proved entirely satisfactory and their operation has resulted in various malfunction of the chain gears, links, and sprockets known in the trade by various terms such as plugging, shedding, entangling, wrapping, choking, stoppages and hairpinning.

It is an object of the present invention to obviate the above-enumerated malfunctions and to provide a reliable conveyor assembly of inexpensive and simple construction.

It is another object of this invention to provide a means for disengaging the conveyed commodity from the impaling lugs or plates which is secured to and forms a part of the conveyor.

It is another object of this invention to provide a minimum space between the discharge end of the reach of the endless conveyor and the receiving platform.

Other and subordinate objects, also comprehended by this invention, together with the precise nature of the improvements and the advantages thereof, will become readily apparent when the following description and claims are read with reference to the drawings accompanying and forming part of this specification.

In said drawings:

FIG. 1 is a fragmentary side elevation of a conventional upright link chain conveyor with my invention applied thereto.

FIG. 2 is a detailed fragmentary view taken on the line 2—2 of FIG. 1.

FIG. 3 is an enlarged detail view illustrating the path and angles assumed by one of the lugs or plates and its contacting arm while passing around a sprocket.

FIG. 4 is a side elevation of a modified form of the invention as applied to a horizontal conveyor.

FIG. 5 is a fragmentary front elevational view showing a cross plate or flight.

Figure 6:
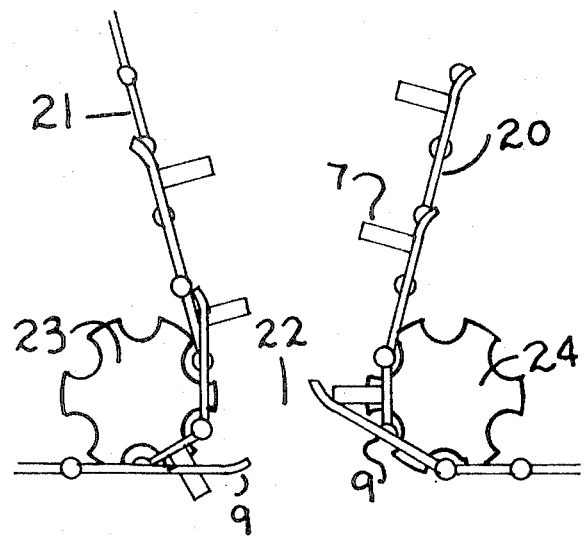
FIG. 6 is a fragmentary top view showing the shedder bars on a crop harvesting assembly.

My invention contemplates the use of one or more endless conveyors designed to prevent shredding of hay bales or the cutting of the binding twine girding said bales by means of a shedder bar designed as an integral part of the conveyor assembly. It further contemplates the transport of cartons and the like whereby at the discharge end of the conveyor, cartons and the like can be discharged at a rate of travel greatly increased compared with the rate of travel of the conveyor. This permits the receiving end of the receiving platform to accommodate successive cartons and the like without pile-up in the event that several cartons are not removed promptly by the operator receiving and removing transported cartons. It further contemplates the clearing of lugs fouled by standing crops and feeds said crops into the feeder rolls when used in a harvesting machine.

My invention will be more fully understood by detailed reference to the drawings in which reference character 1 is a conveyor frame shown in FIG. 1 in an elevated position. Frame 1 includes a pair of parallel angle irons 2 to form a track and chase between which the upward bale or carton transporting conveyor chain 3 travels. A plate, not shown, is secured by any convenient means such as welding to the rearward edges of the angle irons throughout the length thereof and serves to support the conveyor during its travel. The upper reach of the endless conveyor passes over idler sprocket 4 rotatably secured to frame 1 by means of shaft 5 through bearings. A drive sprocket 6 engaging the chain drives the conveyor chain in the direction indicated.

A plurality of spaced impaling lugs or plates 7 are welded on the conveyor and adapted to extend into the bales and secure said bales to elevate or transport the bales on the conveyor. A modification of my invention contemplates the use of transverse cross plates or flights 8, at FIG. 5, at spaced intervals along the conveyor. The cross plates extend laterally of the conveyor to a distance sufficient to engage and support a carton or the like being transported by the conveyor.

One end of a shedding arm cross plate is longitudinally mounted securely to the edge of the conveyor, said ascending end being thereby secured. The free end 10 of said arm extends slightly beyond the next lower ascending impaling lug or cross plate. As illustrated in FIG. 2, shedding arm 9 is securely attached as by welding to link 11 of chain 12, and lies in juxtaposition to link 13 and part of link 14. Thus the shedding arm is secured forward the impaling lug or cross plate as the conveyor travels toward the receiving platform and the free portion of said arm extends longitudinally beyond the link supporting the impaling lug or cross plate terminating alongside the link trailing the said supporting link. As shown in FIG. 1 hay bale 15 is impaled on lug 7 and is being elevated on the conveyor. During this stage of operation shedding arm 9 extends longitudinally of the bale and conveyor. As the bale 15 is elevated to the top of the elevator and the conveyor section bearing the bale passes over the upper idler sprocket 4 the free end of the shedder arm 10 engages the trailing end portion 16 of bale 15 and lifts the bale from its impaling lug 7, thus preventing the impaling lug from shredding the bale or accidentally cutting the bailing twine securing the bale. Preferably I have found it advantageous to form a slight arcuate bend on the free or trailing end 10 of shedder arm 9. This bend, as illustrated is shaped so that the the free end is directed inwardly toward the conveyor and away from the bale or carton. In this way the free end does not catch on the trailing edge 16 of the bale or carton.

FIG. 4 illustrates a modification of my conveyor in a horizontal manner. In this figure it will be seen that the shedder bar is illustrated having just passed over the sprocket 17 adjacent the receiving platform 18. It is to be further noted that with my shedder bar a minimum space may be provided between the conveyor and receiving platform.

My invention as applied to forage harvesters is illustrated in FIG. 6, wherein conveyor 20 and 21 coact to gather standing crops or forage and convey it to the throat 22 of the harvester (not shown). Lugs 7 gather the crops forcing the stalks through the throat of the machine for further processing such as cutting. The shedder arms 9 prevent fouling, plugging and hairpinning of the machine by the forage crop in that they remove the forage from the lugs as the conveyor changes direction around the sprocket or wheels 23 and 24.

An important advantage of my invention resides in the operation of the shedder arm while it traverses the chain sprocket adjacent the receiving platform. In FIG. 3 the shedder arm is exemplified by dashed lines to illustrate various positions assumed as the arm approaches, passes around and recedes from the sprocket 19. As the link of the chain bearing the secured end of the shedder arm engages the sprocket wheel the free end of the shedder arm projects outwardly from the chain longitudinally as an extension of the length of the bearing link. As the angle formed between the shedder arm and trailing link increases the free end of the shedder arm describes an arc of greater radius than that described by the sprocket wheel resulting in a greatly accelerated speed or thrust of the free end of the shedder arm. It becomes readily apparent that an object contacting the shedder arm and conveyor will be lifted by the arm from the conveyor and/or impaling lug or supporting plate and given an accelerated discharge or thrust as the object and contacting shedder arm pass over the sprocket wheel.

By varying the length of the shedder arm some degree of variation of thrust can be imparted the object being conveyed. The shorter the contacting arm, the less thrust and vice versa.

What I claim as new and desire to secure by Letters Patent by the United States is as follows:

1. A conveyor comprising an endless chain, means secured at spaced intervals to said chain for engaging solid objects being conveyed, arms secured by one end adjacent one side of and at spaced intervals on said chain, the opposite end of said arm being arcuate and tangentially contacting said objects being conveyed, said arms disengaging said conveyed objects from said engaging means when said arm passes over sprocket adjacent a discharge area.

2. A conveyor according to claim 1 wherein said means are lugs for engaging forage crops.

3. A conveyor according to claim 2 wherein said means are impaling lugs for engaging bales.

4. A conveyor according to claim 1 wherein said means are cross plates or flights for engaging objects.

* * * * *